United States Patent
Shah et al.

(10) Patent No.: US 10,803,224 B2
(45) Date of Patent: Oct. 13, 2020

(54) PROPAGATING CONSTANTS OF STRUCTURED SOFT BLOCKS WHILE PRESERVING THE RELATIVE PLACEMENT STRUCTURE

(71) Applicant: INTERNATIONAL BUSINESS MACHINES CORPORATION, Armonk, NY (US)

(72) Inventors: Salim Shah, Austin, TX (US); Rokesh Jayasundar, Austin, TX (US); Shyam Ramji, LaGrange, NY (US); Paul G. Villarrubia, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 20 days.

(21) Appl. No.: 16/194,381

(22) Filed: Nov. 18, 2018

(65) Prior Publication Data
US 2020/0159882 A1    May 21, 2020

(51) Int. Cl.
*G06F 30/392* (2020.01)
*G06F 111/04* (2020.01)
*G06F 119/06* (2020.01)
*G06F 119/12* (2020.01)

(52) U.S. Cl.
CPC ........ *G06F 30/392* (2020.01); *G06F 2111/04* (2020.01); *G06F 2119/06* (2020.01); *G06F 2119/12* (2020.01)

(58) Field of Classification Search
USPC ....................................................... 716/122
See application file for complete search history.

(56) References Cited

U.S. PATENT DOCUMENTS

| | | | |
|---|---|---|---|
| 8,434,035 B2 | 4/2013 | Arunachalam | |
| 8,954,915 B2 | 2/2015 | Chan et al. | |
| 2002/0087939 A1* | 7/2002 | Greidinger | G06F 30/394 716/122 |
| 2002/0087940 A1* | 7/2002 | Greidinger | G06F 30/394 716/108 |
| 2007/0245280 A1* | 10/2007 | Van Eijk | G06F 30/392 716/102 |
| 2014/0359546 A1* | 12/2014 | Chan | G06F 30/392 716/119 |

OTHER PUBLICATIONS

Thomas Kutzschebauch, "Efficient Logic Optimization Using Regularity Extraction, International Conference on Computer Design", 2000, 7 pages.

* cited by examiner

*Primary Examiner* — Mohammed Alam
(74) *Attorney, Agent, or Firm* — Jason Sosa; Amy J. Pattillo

(57) ABSTRACT

A design system accesses at least one placement template for at least one structured soft block composed of a pre-defined set of cells with relative placement information for the pre-defined set of cells. The design system optimizes implementation of the at least one structured soft block by propagating constants while preserving relative placement structure of the pre-defined set of cells within each at least one structured soft block according to the respective at least one placement template accessed for the at least one structured soft block.

20 Claims, 8 Drawing Sheets

PROPAGATING CONSTANTS OF STRUCTURED SOFT BLOCKS WHILE PRESERVING THE RELATIVE PLACEMENT STRUCTURE

BACKGROUND

1. Technical Field

This invention relates in general to integrated circuits and more particularly to optimizing placement of a selected group of cells in an integrated circuit by modifying structured soft blocks (SSBs) by propagating constants while preserving the relative placement structure of the SSBs.

2. Description of the Related Art

Integrated circuits (ICs) are used for a wide variety of electronic applications, from devices to complex computer systems. An IC chip is generally a collection of logic cells with electrical interconnections between the cells, formed on a semiconductor substrate. IC chips include ranges of numbers of cells, with connections between the cells that become more complicated as the number of cells increase.

BRIEF SUMMARY

In one embodiment, a method is directed to accessing, by a computer system, at least one placement template for at least one structured soft block composed of a pre-defined set of cells with relative placement information for the pre-defined set of cells. The method is directed to optimizing, by the computer system, implementation of the at least one structured soft block by propagating constants while preserving relative placement structure of the pre-defined set of cells within each at least one structured soft block according to the respective at least one placement template accessed for the at least one structured soft block, wherein propagating constants comprises determining, based on a respective input to a respective logic gate of a plurality of logic gates from among the pre-defined set of cells within the at least one structured soft block, whether the respective logic gate is known by a respective constant and determining whether to perform at least one of substituting and deleting the respective logic gate based on the value of the respective constant.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to access at least one placement template for at least one structured soft block composed of a pre-defined set of cells with relative placement information for the pre-defined set of cells. The stored program instructions comprise program instructions to optimize implementation of the at least one structured soft block by propagating constants while preserving relative placement structure of the pre-defined set of cells within each at least one structured soft block according to the respective at least one placement template accessed for the at least one structured soft block, wherein propagating constants comprises determining, based on a respective input to a respective logic gate of a plurality of logic gates from among the pre-defined set of cells within the at least one structured soft block, whether the respective logic gate is known by a respective constant and determining whether to perform at least one of substituting and deleting the respective logic gate based on the value of the respective constant.

In another embodiment, a computer program product comprises a computer readable storage medium having program instructions embodied therewith, wherein the computer readable storage medium is not a transitory signal per se. The program instructions executable by a computer to cause the computer to access, by a computer, at least one placement template for at least one structured soft block composed of a pre-defined set of cells with relative placement information for the pre-defined set of cells. The program instructions executable by a computer to cause the computer to optimize, by the computer, implementation of the at least one structured soft block by propagating constants while preserving relative placement structure of the pre-defined set of cells within each at least one structured soft block according to the respective at least one placement template accessed for the at least one structured soft block, wherein propagating constants comprises determining, based on a respective input to a respective logic gate of a plurality of logic gates from among the pre-defined set of cells within the at least one structured soft block, whether the respective logic gate is known by a respective constant and determining whether to perform at least one of substituting and deleting the respective logic gate based on the value of the respective constant.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
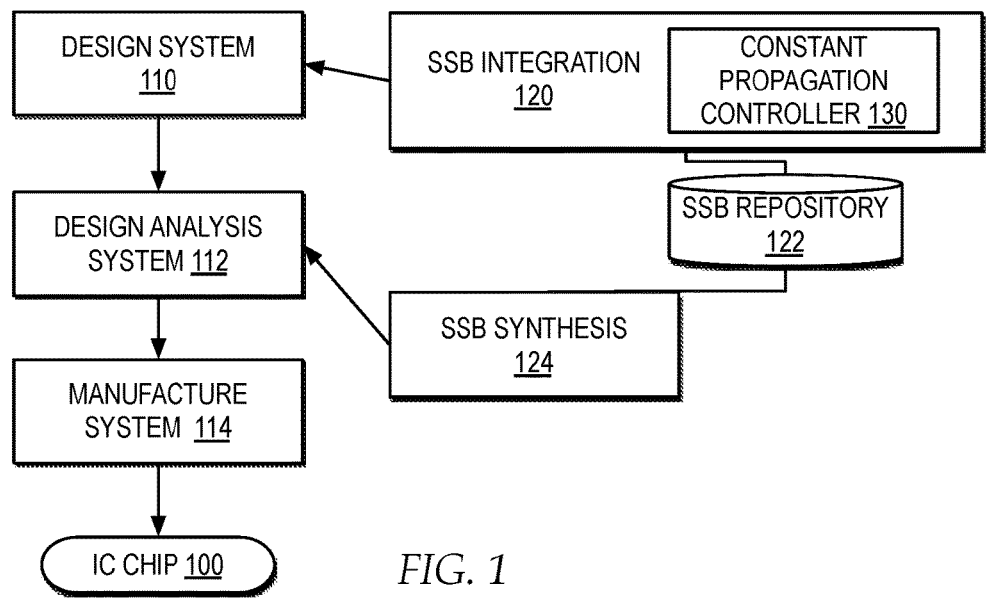
FIG. 1 is a block diagram illustrating one example of a system for generating an IC chip with optimized placement of a selected group of cells though structured soft blocks (SSBs) modified by propagating constants while preserving the relative placement structure.

FIG. 1 illustrates a block diagram of one example of a system for generating an IC chip with optimized placement of a selected group of cells though structured soft blocks (SSBs) modified by propagating constants while preserving the relative placement structure.

In one example, an IC chip 100 represents a collection of logic cells, with electrical interconnections between the cells, formed on a semiconductor substrate. IC chip 100 includes a range of number of cells, with connections between the cells. As the number of cells increases, the connections between the cells increase in complexity. In one example, each cell in IC chip 100 includes one or more pins, each of which is connected to one or more other pins of other cells in IC chip 100 by wires. In one example, the wires connecting the pins of IC chip 100 are also formed on the surface of the chip and may be implemented on multiple distinct layers of conducting media available for routing, depending on the complexity of design for connecting cells on IC chip 100. For example, IC chip 100 includes one or more polysilicon layers and one or more metal layers used for vertical and horizontal routing of connections between pins of cells.

In one example, each cell within IC chip 100 includes a collection or group of one or more circuit elements such as, but not limited to, transistors, capacitors, resistors, inductors, which when combined, perform one or more logic functions. In one example, IC chip 100 represents cells of one or more types such as, but not limited to, core cells, scan cells, input/output (I/O) cells, and memory or storage cells.

In one example, to reach a fabricated IC chip 100, a design flow may include one or more steps including, but not limited to one or more steps performed by a design system 110, one or more steps performed by a design analysis system 112, and one or more steps performed by a manufacture system 114. In the example, each of design system 110, design analysis system 112, and manufacture system 114 include one or more automated steps and may also include one or more steps directed by a designer. In another embodiment, the design flow illustrated in FIG. 1 may include additional or alternate systems. In one example, design system 110 and design analysis system 112 may represent separate systems or may represent systems integrated into a single system. In one example, one or more of design system 110 and design analysis system 112 are implemented through an electronic design automation (EDA) system, such as, but not limited to, Verilog, VHDL, and TDML.

In one example, design system 110 may facilitate creation of a logic design for a multilayered IC package from concept and architecture selections by a designer or automated tool. In one example, design system 110 supports an architecture design for a multilayered IC package identifying the placement of cells and interconnections, through placement of signal lines, voltage, and ground reference mesh layers, along with voltage and ground vias. In one example, designs system 110 identifies the architecture design, generates a logical circuit description of the cells and connections from the architecture design and then converts the logical circuit description into a physical description, or geometric layout in a design hardware description language (HDL) file. In one example, the conversion of a logical description into a physical description may include use of a "netlist", which is a record of all the nets, or interconnections, between cells and pins, and may include additional information about the cell circuitry. A layout may include a set of planar geometric shapes in several layers.

Design analysis system 112 analyzes the layout produced by design system 100. In one example, design analysis system 112 analyzes the layout produced by design system 100 and modifies the layout to ensure the layout meets all of the design requirements. For example, design analysis system 112 may perform physical synthesis as a function of automated design of IC chip 100 by concurrently optimizing placement, timing, power consumption, crosstalk effects, and the like in an integrated circuit design. In one example, a comprehensive approach through physical synthesis helps to eliminate iterations between circuit analysis and place-and-route. During physical synthesis, design analysis system 112 has the ability to repower gates by changing their sizes, insert repeaters through buffers or inverters, clone gates or combinational logic, and other changes. In one example, physical synthesis may require a significant amount of time, and computational requirements increase, to complete as design sizes increase and more gates need to be placed. In addition, as design sizes increase, the potential for bad placements of cells increase during physical synthesis due to limited area resources.

Manufacture system 114 fabricates the modified package design from design analysis system 112 to generate IC chip 100. In one example, manufacture system 114 may initially run the modified layout produced by design analysis system 112 through a dataprep process that is used to produce patterns called masks by an optical or electronic beam pattern generator. During fabrication by manufacture system 114, in one example, the masks are used to etch or deposit features in a silicon wafer in a sequence of photolithographic steps using a complex lens system that shrinks the mask image. In one example, the process of converting the specifications of an electronic circuit into a layout generated by manufacture system 114 is referred to as a physical design. In one example, in additional or alternate embodiments, additional or alternate fabrication processes and fabrication materials may be implemented.

In the embodiment, to assist designers in designing high performance circuits, design system 110 may offer tools for assisting designers to improve aspects of physical implementation while performing architectural design steps. In particular, at the architectural design phase, to mitigate physical implementation issues that increase the complexity of physical synthesis steps, such as die size growth, timing issues, and power distribution problems that may be introduced by a custom design, design system 110 facilitates microprocessor design that allows a designer to integrate pre-defined building blocks into large integrated circuit designs. In one example, a building block represents a selection of cells with a starting point for a layout of the cells by setting one or more constraints such as block size, feed through, power, and clock routing that minimize the physical synthesis required from design analysis system 112 for each building block. In one example, types of building blocks may include, but are not limited to, random logic macros (RLMs), structured data paths (SDPs), and arrays.

In one example, design system 110 supports a designer generating a fully synthesized design using building blocks, which may mitigate the complexity of physical synthesis by design analysis system 112 that would otherwise be required if a custom design were produced. However, while productivity may improve through leveraging fully synthesized building blocks for a design solution, during the design process, designers may need to modify the building blocks with customizations or may need to add custom designed elements to the larger design, potentially triggering additional physical synthesis steps. An advantage of the invention is that design system 110 and design analysis system 112 support customization of building blocks, which allows for customization at early design stages, while maintaining the benefit of automated placement routines in building blocks through use of structured soft blocks (SSBs), which represent a relative placement specification paradigm, to minimize physical synthesis required for SSB based building blocks.

In the example, SSB integration 120 supports designer creation of an SSB 122 repository of structured soft blocks (SSBs), each composed of a pre-defined set of library cells and relative placements of the cells in a placement template, or bit group, that capture one or more aspects of a custom design based on building blocks, but not full customization. The resulting circuit designs achieve the benefits of customization with much less resource investment. SSB integration 120 allows designers to instantiate SSBs into high level logic through design system 110 and SSB synthesis 124 supports physical synthesis of SSBs by design analysis system 112 to support efficient synthesis of partially customized designs, while also supporting reuse.

In one example, to optimize placements of SSBs and minimize synthesis requirements, during the build step of SSBs, SSB integration 120 may flatten all the common blocks in an SSB. In addition, to according to an advantage of the invention SSB integration 120 supports modification and optimization of the implementation of an SSB by propagating constant information, while preserving the relative placement structure of the block as specified by a relative placement specification of a placement template, to support efficient physical synthesis by SSB synthesis 124.

In one example, in modifying SSBs by propagating constant information, or propagating constants, SSB integration 120 includes constant propagation controller 130 for managing constant propagation, while preserving the relative placement of the block as specified by a placement template. In one example, constant propagation and propagating a constant may refer to a process of determining, based on inputs to a logic gate, whether the value of the logic gate is known and the logic gate may be substituted or deleted by the value of a known constant, whether a constant value, such as VDD or GND, or a variable input. For example, given the inputs to a logic gate, propagation of constants refers to the process of moving stage by stage, from the input gates to the output gate, determining whether the value of the logic gate is known by a constant of either a constant value or a variable input and whether the logic gate may be substituted or deleted based on the value of the known constant. For example, constant propagation controller 130 may determine that based on the inputs to a logic gate, the output is always a constant of either a constant value, such as GND or VDD, or the same as one of the variable inputs, thereby allowing constant propagation controller 130 to delete the logic gate and direct wire either the always known constant, in order to optimize the block for area, timing and power. In another example, constant propagation controller 130 may determine that based on the inputs to a logic gate, the output is always a known constant of the inversion of one of the variable inputs, thereby allowing constant propagation controller 130 to switch out the logic gate to an inverter with an input of the known constant of the variable input, in order to optimize the block for area, timing and power.

A challenge that may occur during propagation of constants is that when logic gates alone are deleted, the deletion of the logic gate may result in the removal of a cell in an SSB layout, which may cause disruption in the SSB layout placement and wiring. An advantage of the invention is that during propagation of constants at the logic level, constant propagation controller 130 preserves the physical placement structure of cells in an SSB by dynamically modifying the placement template to include filler cells in place of any removed gates to remove any disruption to the SSB placement and wiring that would occur if the gate were deleted without preservation of the relative placement of the block.

In one embodiment, constant propagation controller 130 propagates constants through one or more stages of logic. For example, constant propagation controller 130 propagates constants through each stage of logic by changing a logic gate to an inverter, switching the existing gate implementation, but preserving the relative placement structure of cells, and propagating a constant through the inverter, whether a constant value or variable input. In another example, constant propagation controller 130 propagates constants through each stage of logic by deleting a cell and propagating a constant, whether a constant value or variable input, which may include accessing the relative placement specification for the SSB in a placement template, creating a filler instance spanning the size and width of the existing cell instance that is changed, and modifying the relative placement specification for the SSB to replace the existing cell instance with the filler instance, resulting in a modifying the relative placement specification for the SSB. Each stage of logic may be identified sequentially starting from the gates receiving inputs to the SSB to the gates sending outputs from the SSB. Once all the stages of logic are complete, constant propagation controller 130 deletes inverter pairs and propagates the signal, which may include accessing the relative placement specification for the SSB, creating multiple filler instances each spanning the size and width of the existing cell instances that are deleted, and modifying the relative placement specification for the SSB to replace the existing cell instances with the filler instances, resulting in a modifying the relative placement specification for the SSB. Based on the modified SSB logic and modified relative placement specification for the SSB, constant propagation controller 130 recompiles the SSB placement template for the SSB stored in SSB repository 122.

In one example, SSB synthesis 124 may access a design HDL file, or netlist, having one or more instantiated SSBs. SSB synthesis 124 also receives a gate level logic description for each instantiated SSB from SSB repository 122. The design HDL file having the full logic information undergoes a front-end synthesis procedure performed by design analysis system 112, wherein analysis of the SSB components is managed by SSB synthesis 124. In one example, design analysis system 112 maps logic gates to library cells, resulting in a gate-level netlist, which includes the SSBs. The HDL file netlist is also used by a top-level bit compile routine of SSB synthesis 124 to deconstruct the SSBs. SSB synthesis 124 may also include a user bit compile routine to allow the designer to customize additional SSBs. SSB synthesis 124 may analyze the outputs of the top-level bit compile routine and user bit compile routine through a relative placement procedure that obtains the relative placement information for each SSB from placement templates stored in SSB repository 122. SSB synthesis 124 determines a result of the relative locations for cells of all SSBs and combines these relative locations with the gate-level netlist in a placement optimization which preserves the relative locations of any cells within any SSB, resulting in a placed gate-level design. SSB synthesis 124 may further optimize the placed gate-level design through timing optimization and gate resizing. For example, for timing optimizations, while design analysis system 112 may generally insert buffers along selected wire paths, or nets, to achieve timing closure during physical synthesis, SSB synthesis 124 may hide internal nets within SSBs within a design from buffering by design analysis system 112, but allow buffering along external net interconnections between SSBs.

In addition, in one example, SSB synthesis 124 may hide other internal details of SSBs defined in SSB repository 122. For example, SSB synthesis 124 may inhibit design analysis system 112 from logic restructuring of cells within an SSB. In one example, the purpose of logic restructuring is to find a circuit that has an identical logic function of an original circuit but has reduced propagation delays through the circuit. Internal pins of an SSB, such as pins of cells within an SSB which are not used for external nets, may be hidden by SSB synthesis 124 to prevent pin-swapping. Cells of an SSB may be hidden by SSB synthesis 124 during some gate resizing operations performed by design analysis system 112, however gate resizing of SSB cells may be allowed later. Cells of an SSB may also be hidden by SSB synthesis 124 to prevent cloning by design analysis system 112.

Figure 2:
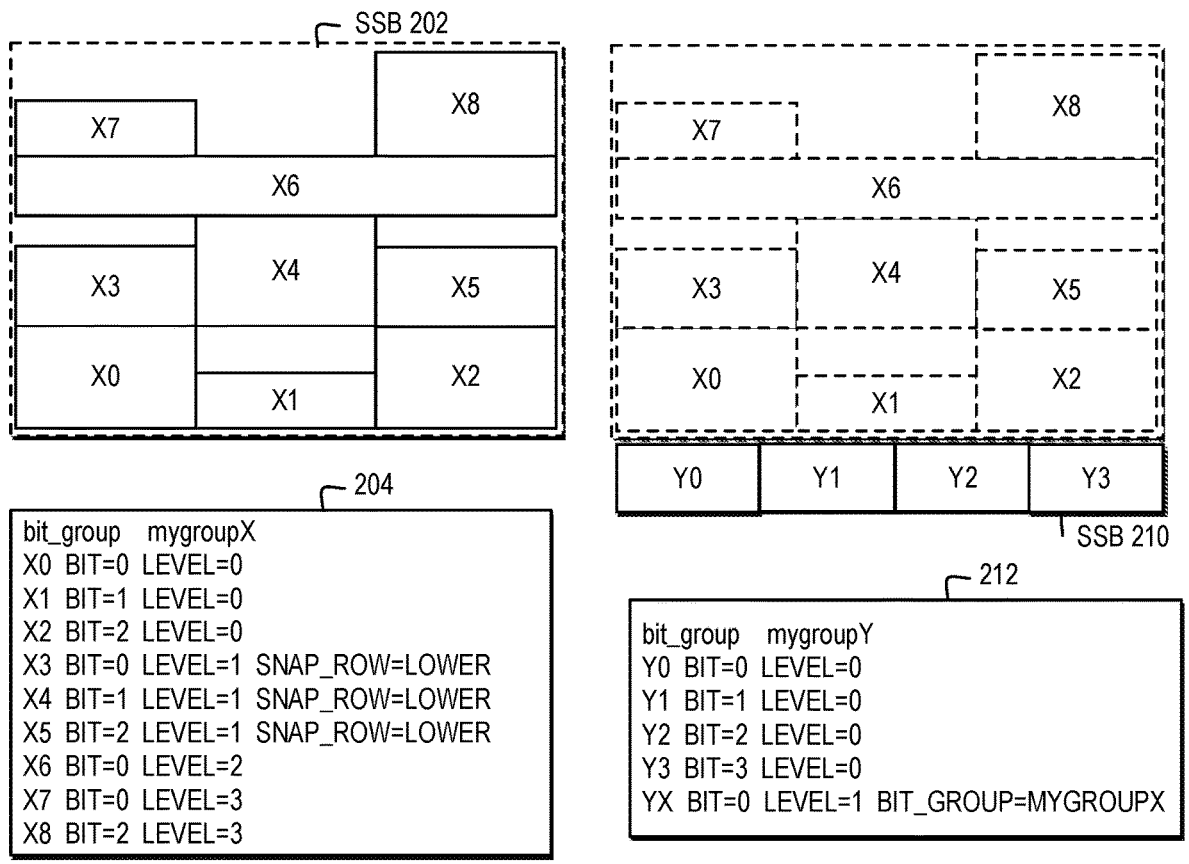
FIG. 2 is a block diagram illustrating one example of a layout view of a hierarchy of SSBs each with multiple cells and placement templates for specifying the layout and the hierarchy for each SSB.

FIG. 2 illustrates a block diagram of one example of a layout view of a hierarchy of SSBs each with multiple cells and placement templates for specifying the layout and the hierarchy for each SSB.

In the example, a structured soft block (SSB) 202 represents a layout or physical view of an SSB including multiple cells, labeled X0-X8 for purposes of illustration, which may be stored in SSB repository 122. Each cell may represent one or more gates or logic circuit elements. Each cell identified in SSB 202 may be part of a larger integrated circuit design. The integrated circuit design incorporating SSB 202 may be a large block synthesis (LBS) including multiple instances of SSB 202. Each of the cells identified in SSB 202 may be part of a design library that contains associated information for each cell type. Information for each cell type may include, but is not limited to, gate sizes, resistances, and capacitances.

According to an advantage of the invention, a designer may modify a placement template specification for SSB 202 in SSB repository 122 to inform SSB synthesis 124 exactly how cells X0-X8 are to be placed relative to each other. In the example, SSB placement template coding 204 illustrates one example of a placement template specification in an HDL file for SSB 202 specifying the relative placement of cells X0-X8 to one another. In another example, another type of placement template may be implemented for specifying how cells X0-X8 are to be placed relative to each other in a manner that is readable by SSB synthesis 124.

In particular, in the example, SSB placement template coding 204 includes an SSB "bit_group" is defined and given the label "mygroupX". Each subsequent line of SSB placement template coding 204 includes a cell designator of X0-X8 and corresponding relative placement information for the designated cell. In the illustrative example, the relative placement information takes the form of two values of a "level" representing a row within an SSB template and "bit" representing a location along the row. For example, cells X0, X1, and X2 have been assigned to the first row, which in the implementation is also illustrated as the lowest row, by setting the "level" parameter to "0". The location of cells X0, X1, and X2 within this lowest row are set using the "bit" parameter, assigning cell X0 to position "0" indicating the cell should be placed at the first available location within the row, cell A1 to position "1" a next available position in the row next to X0, and cell X2 to position "2", a subsequent available position in the row next to X1. In one example, the position assigned to X0 may represent an anchor point or origin for the SSB template. In the embodiment illustrated, the anchor point is illustrated in the lower left corner, however in additional or alternate embodiments, the anchor point could default to a different location. In addition, while in the embodiment illustrated the "bit" and "level" parameters are similar to x and y coordinates in a Cartesian system, they do not necessarily represent exact positional values and in another embodiment, additional or alternate parameters may be implemented to identify the relative positions of cells within the SSB.

In the example, cells in SSB 202 may not be immediately placed adjacent to one another. For example, in SSB 202 there are only two cells, X7 and X8 in the topmost row, and cell X7 is given a bit location of "0", while cell X8 is given a bit location of "2", leaving a gap, which as illustrated could accommodate another cell.

In the example, cells in SSB 202 may not have the same vertical or horizontal dimensions and the row heights may vary based on the height of the tallest cell assigned to each row. For example, in SSB 202, the first and second rows are the same height, however the third and fourth rows are different heights. Due to the varying cell heights, a vertical row could start at a different vertical position across bit locations of the SSB. To align cells in a row across a bit position, SSB placement template coding 204 includes one or more additional parameters to indicate how the cells should be relatively positioned vertically within a row, such as a position against the top edge of the row or a position against the bottom edge of the row. For example, SSB placement template coding 204 includes a parameter of "snap_row" set to "lower", assigned to X3, X4, and X5, forcing the cells in row 1 to be placed along the lower edge of the row. In another embodiment, other parameters may be used to determine cell location within the SSB placement template code 204. For example, a vertical gap could be created between rows based on parameters specified in the placement template. In another example, the shape of the area described by a placement template may be a shape other than rectangular.

In the example, SSB integration 120 may compile SSB 202 and SSB placement template coding 204 into a bit compile file for SSB 202 that can be stored in SSB repository 122 for SSB synthesis 124, along with a gate-level netlist for the SSB generated by SSB integration 120 into design system 110. Once the SSB is available in SSB repository 122, it can be used and reused for different circuit designs.

According to an advantage of the invention, as constant propagation controller 130 optimizes SSBs in a design, by propagating constants, constant propagation controller 130 may replace a cell in SSB 202 with a filler cell and also modify the description of the replaced cell in SSB placement template coding 204, to preserve the relative placement structure of SSB 202 as specified by SSB placement template coding 204.

In the example, FIG. 2 illustrates an example of how multiple SSBs may be used in an integrated circuit design. SSB constructed through SSB integration 120 may be hierarchical in nature, meaning that one SSB at a higher logic level may be composed of one or more other SSBs at a lower logic level, along with other cells. In one example, when an SSB at a lower logic level is incorporated into an SSB at a higher logic level, the lower level SSB may be referred to as an SSB module. In the example, In the example, SSB placement template coding 212 also species the placement of SSB 210 relative to SSB 202.

For example, an SSB 210 represents a layout or physical view of a higher level SSB which is composed of multiple cells labeled Y0-Y3 and a lower level instance of SSB 202. SSB placement template coding 212 identifies the bit group for SSB 210 with the label "mygroupY". The four subsequent lines in SSB placement template coding 212 identify the row assignments of the four cells labeled Y0-Y3 and the lower level SSB, and the locations of these objects within each row. For example, the last line of SSB placement template coding 212 designate the lower level SSB through an additional parameter setting for "BIT_GROUP", set to the label for SSB 202 of "mygroupX".

In additional or alternate embodiments, additional or alternate SSBs may be composed of additional or alternate SSBs in one or more hierarchical arrangements as defined in placement template coding for each SSB. In addition, SSB 210 may be used as a building block for an even larger SSB including additional SSBs or other cells. In addition, a designer may create custom SSB templates by inserting appropriate coding with the HDL file for a particular circuit.

Figure 3:
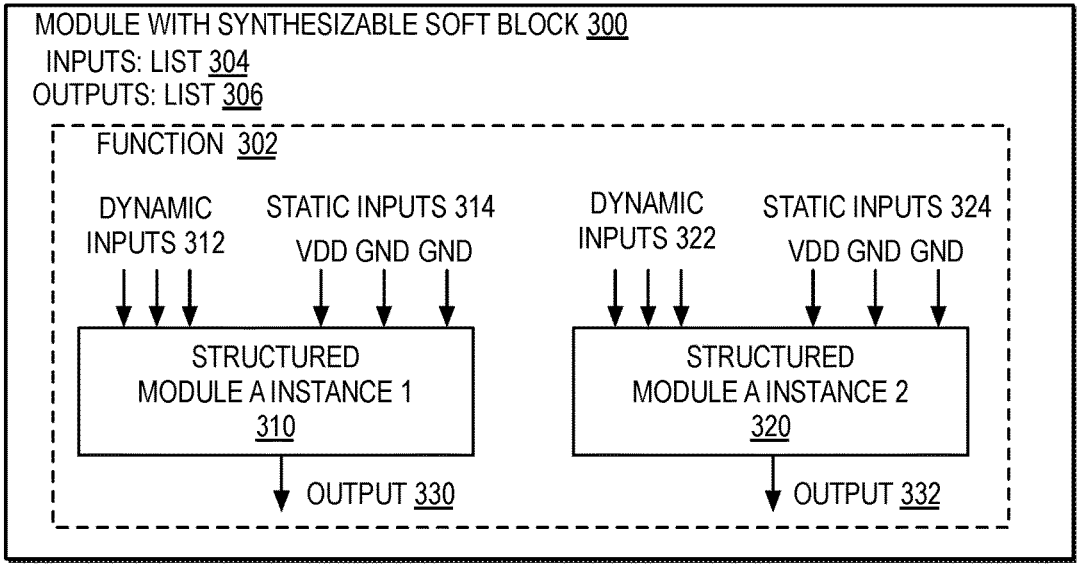
FIG. 3 is a block diagram illustrating one example of module synthesizable soft block including multiple instances of a customized SSB module for performing a function.

FIG. 3 illustrates a block diagram of one example of module synthesizable soft block including multiple instances of a customized SSB module for performing a function.

In one example, a module with synthesizable soft blocks 300 available in the SSB repository 122 represents a description for a particular function 302, which may integrate multiple instances of SSBs. In the example, module with synthesizable soft blocks 300 represents a structural description of the input and output behavior of the circuit that performs function 302 by producing intermediate dynamic inputs 312 and dynamic inputs 322 from inputs of a list 304.

Dynamic inputs 312 and dynamic inputs 322 are inputs to embedded structure blocks illustrated by structured module A instance 1 310 and structured module A instance 2 320, respectively. In addition, structured module A instance 1 310 receives static inputs 314 of a voltage (VDD) and ground (GND) signals and structured module A instance 2 320 receives static inputs 324 of the same VDD and GND signals.

In the example, an output 330 from structured module A instance 1 310 and an output 332 from structured module A instance 2 320 are used to complete function 302, and generate outputs of a list 306.

According an advantage of the invention, structured module A instance 1 310 and a structured module A instance 2 320 represent instances of a common module, customized by a designer with specific selection of inputs from among dynamic inputs 312 and static inputs 314 used as inputs to structured module A instance 1 310 and specific selections of inputs from among dynamic inputs 332 and static inputs 324 to structured module A instance 2. In the example, as a user customizes the selection of inputs for each instance of a common module, constant propagation controller 130 manages modification and optimization of the implementation of module synthesizable soft block 300 by propagating constants for each instance of the common module, based on the inputs customized, while preserving the relative placement structure of the block as specified by a placement template for module synthesizable soft block 300.

Figure 4:
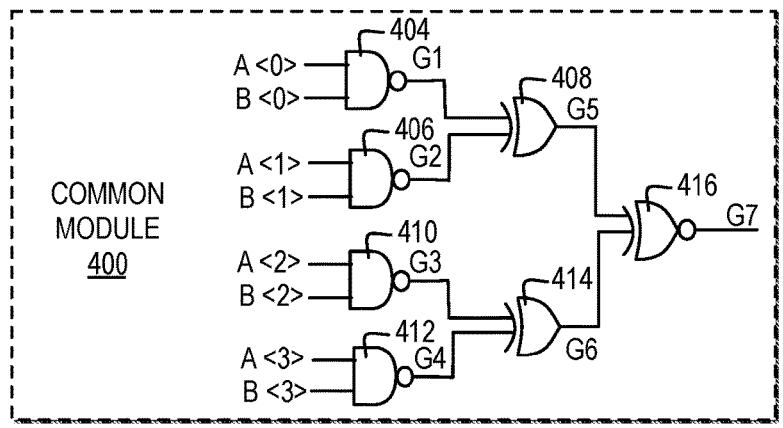
FIG. 4 is a block diagram illustrating one example of logical views of structured module instances of a common module, as customized in an SSB.
Figure 4:
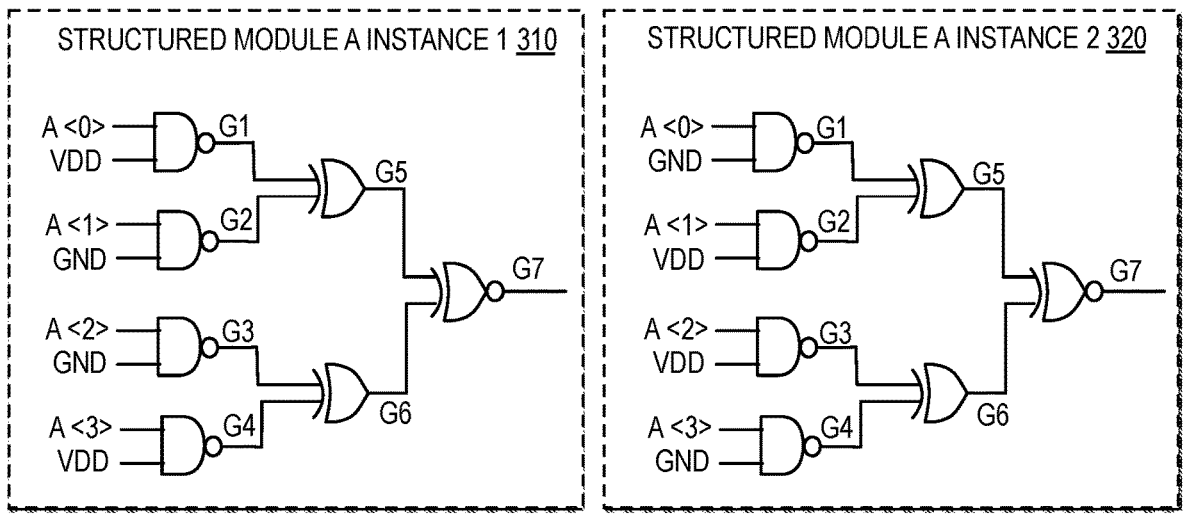

FIG. 4 illustrates a block diagram of one example of logical views of structured module instances of a common module, as customized in an SSB.

In one example, a common module 400 represents a logical view of a selection of gates for a common, reusable module in an SSB. In the example, the functional block of circuits of common module 400 performs a function on dynamic inputs 212 illustrates as "A<0>", "B<0>", "A<1>", "B<1>", "A<2>", "B<2>", "A<3>", and "B<3>". In the example, inputs "A<0>" and "B<0>" are inputs to a NOT-AND (NAND) gate G1 404, inputs "A<1>" and "B<1>" are inputs to a NOT-AND (NAND) gate G2 406, the outputs of gate G1 404 and gate G2 406 are inputs to an exclusive-or (EOR) gate G5 408. In the example, inputs "A<2>" and "B<2>" are inputs to a NOT-AND (NAND) gate G3 410, inputs "A<3>" and "B<3>" are inputs to a NOT-AND (NAND) gate G4 412, the outputs of gate 410 and gate 412 are inputs to an exclusive-or (EOR) gate G6 414. In the example, outputs of EOR gate G5 408 and EOR gate G6 414 are inputs to an exclusive-NOR (ENOR) gate G7 416.

In one example, structured module A instance 1 310 represents a logical view of common module 400, customized with inputs "A<0>", "VDD", "A<1>", "GND", "A<2>", "GND", "A<3>", and "VDD". In one example, structured module A instance 2 320 represents a logical view of common module 400, customized with inputs "A<0>", "VDD", "A<1>", "GND", "A<2", "GND", "A<3>", and "VDD".

According an advantage of the invention, as a user customizes the selection of inputs for each instance of a common module for structured module instance 1 310 and structured module instance 2 320, constant propagation controller 130 manages modification and optimization of the implementation of module synthesizable soft block 300 by propagating constants for each instance of the common module, based on the inputs customized, while preserving the relative placement structure of the block as specified by a placement template for module synthesizable soft block 300.

Figure 5:
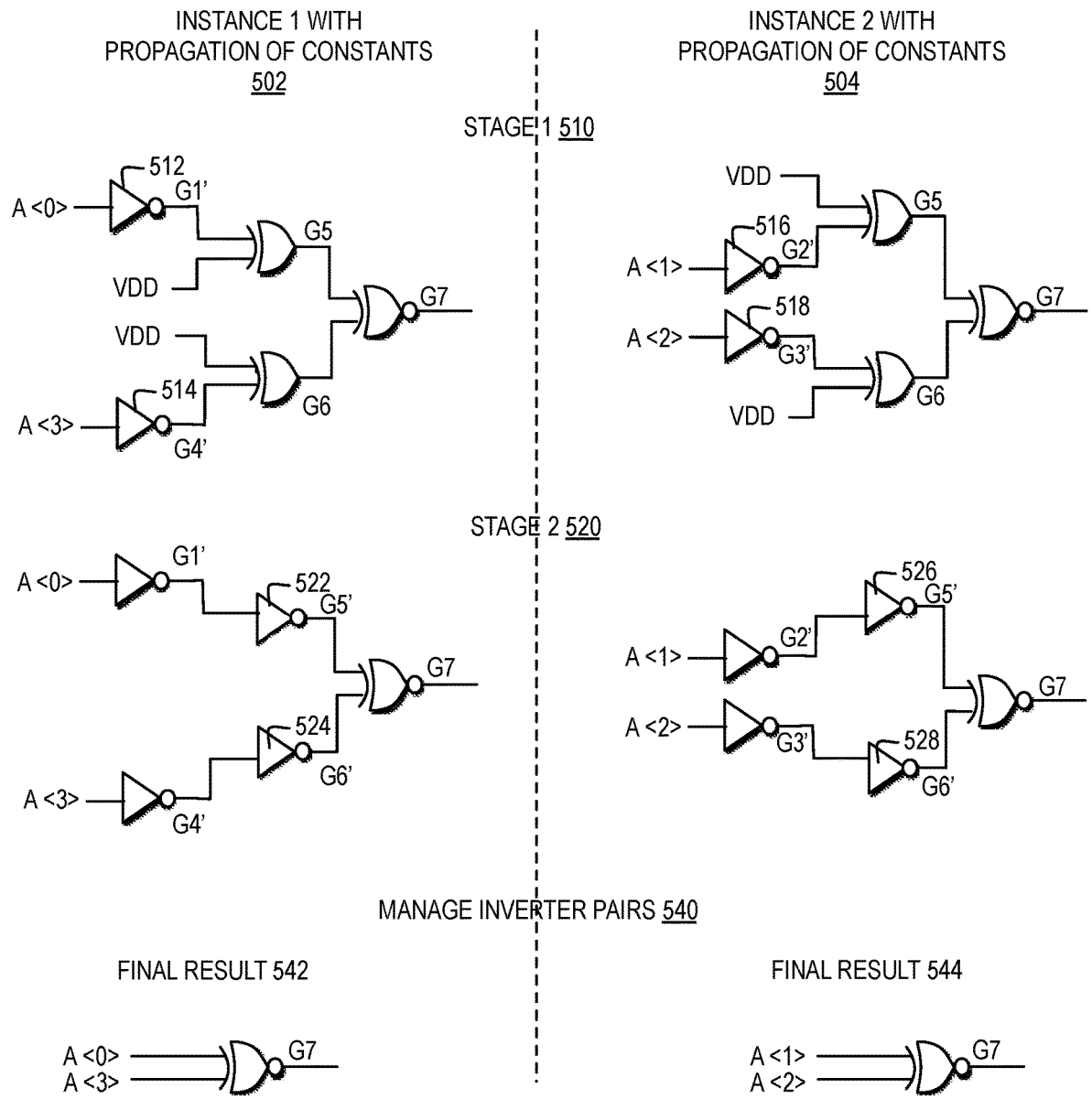
FIG. 5 is circuit diagrams illustrating examples of logical views of structured module instances of an SSB optimized through propagation of constants.

FIG. 5 illustrates circuit diagrams of examples of logical views of structured module instances of an SSB optimized through propagation of constants.

In one example, FIG. 5 illustrates the logical view of stages of optimizing structured module A instance 1 310 and structured module A instance 2 320 through propagation of constants, illustrated by instance 1 with propagation of constants 502 and instance 2 with propagation of constants 504.

In one example, at a first stage of logic, illustrated as stage 1 510, as to "instance 1", constant propagation controller 130 performs propagation of constants by changing gate G1, with an input of "A<0>" and VDD, to an inverter gate G1' 512 with an input of "A<0>" and changing gate G4, with an input of "A<3>" and VDD, to an inverter gate G4' 514 with an input of "A<3>". In particular, in the example, based on the inputs of "A<0>" and "VDD" to NAND gate G1, the VDD inputs refers to a constant logic "1" and as a result, the effective output of NAND gate G1 is the inverse of "A<0>", such that through propagating a constant, NAND gate G1 may be switched to inverter gate G1' 512. In particular, in the example, based on the inputs of "A<3>" and "VDD" to NAND gate G4, the VDD inputs refers to a constant logic "1" and as a result, the effective output of NAND gate G4 is the inverse of "A<3>", such that through propagating a constant, NAND gate G4 may be switched to inverter gate G4' 514.

In addition, at stage 1 510, as to "instance 1", constant propagation controller 130 performs propagation of constants by deleting gate G2, with an input of "A<1>" and GND, and directly wiring VDD to gate G5 and deleting gate G3, with an input of "A<2>" and GND and directly wiring VDD to gate G6. In particular, in the example, based on the inputs of "A<1>" and "GND" to NAND gate G2, the GND inputs refers to a constant logic "0" and as a result, the effective output of NAND gate G2 is a constant logic 1, or VDD, such that through propagating a constant, NAND gate G2 may be deleted and the constant VDD propagated. In addition, in particular, in the example, based on the inputs of "A<2>" and "GND" to NAND gate G3, the GND inputs refers to a constant logic "0" and as a result, the effective output of NAND gate G3 is a constant logic 1, or VDD, such that through propagating a constant, NAND gate G3 may be deleted and the constant VDD propagated.

In addition, in one example, at a first stage of logic, illustrated as stage 1 510, as to "instance 2", constant propagation controller 130 performs propagation of constants by changing gate G2, with an input of "A<1>" and VDD, to an inverter gate G2' 516 with an input of "A<1>" and changing gate G3, with an input of "A<2>" and VDD, to an inverter gate G3' 518 with an input of "A<2>". In addition, at stage 1 510, as to "instance 2", constant propagation controller 130 performs propagation of constants by deleting gate G1, with an input of "A<0>" and GND, and directly wiring VDD to gate G5 and deleting gate G4, with an input of "A<3>" and GND and directly wiring VDD to gate G6.

In one example, at a second stage of logic, illustrated as stage 2 520, as to "instance 1", constant propagation controller 130 performs propagation of constants by changing gate G5, with an input from G1' 512 and VDD, to an inverter gate G5' 522 with an input from G1' 512 and changing gate G6, with an input of G4' 514 and VDD, to an inverter gate G6' 524 with an input of G4' 514. In particular, in the example, based on the inputs the output of G1' 512 and "VDD" to NAND gate G5, the VDD inputs refers to a constant logic "1" and as a result, the effective output of NAND gate G5 is the inverse of the output of G1' 512, such that through propagating a constant, NAND gate G5 may be switched to inverter gate G5' 522. In addition, in the example, based on the inputs the output of G4' 514 and "VDD" to NAND gate G6, the VDD inputs refers to a constant logic "1" and as a result, the effective output of NAND gate G6 is the inverse of the output of G4' 514, such that through propagating a constant, NAND gate G6 may be switched to inverter gate G6' 524.

In addition, in one example, at a second stage of logic, illustrated as stage 2 520, as to "instance 2", constant propagation controller 130 performs propagation of constants by changing gate G5, with an input from G2' 516 and VDD, to an inverter gate G5' 526 with an input from G2' 516 and changing gate G6, with an input of G3' 518 and VDD, to an inverter gate G6' 528 with an input of G3' 518. In particular, in the example, based on the inputs the output of G2' 516 and "VDD" to NAND gate G5, the VDD inputs refers to a constant logic "1" and as a result, the effective output of NAND gate G5 is the inverse of the output of G2' 516, such that through propagating a constant, NAND gate G5 may be switched to inverter gate G5' 526. In addition, in the example, based on the inputs the output of G3' 518 and "VDD" to NAND gate G6, the VDD inputs refers to a constant logic "1" and as a result, the effective output of NAND gate G6 is the inverse of the output of G3' 518, such that through propagating a constant, NAND gate G6 may be switched to inverter gate G6' 528.

In one example, subsequent to propagating constants through the stages of logic, constant propagation controller 130 determines whether there are any pairs of inverters resulting, which negate one another, illustrated as manage inverter pairs 540. In the example, under manage inverter pairs 540, as to "instance 1", constant propagation controller 130 deletes inverter pairs of G1' 512 and G5' 522 and propagates signal "A<0>" directly to gate G7 and deletes inverter pairs of G4' 514 and G6' 524 and propagates signal "A<3>" directly to gate G7 for "instance 1", to generate a final result 542. In addition, in one example, at manage inverter pairs 540, as to "instance 2", constant propagation controller 130 deletes inverter pairs of G2' 516 and G5' 526 and propagates signal "A<1>" directly to gate G7 and deletes inverter pairs of G3' 518 and G6' 528 and propagates signal "A<2>" directly to gate G7 for "instance 2", to generate a final result 544.

In the example, the propagation of constants illustrated for "instance 1" and "instance 2" produces an implementation with better area usage, timing, and power profile, by reducing the amount of required circuitry for implementation of the customized instances of common module 400 from 5 gates to 1 gate and minimizing physical synthesis analysis. For example, in a large IC chip design, if a number of SSB gates in the design before constant propagation optimization is 91160 cells, by applying constant propagation optimization, the number of SSB gates may be reduced by 5% to 86326 cells, which improves area usage, timing and power consumption.

Figure 6:
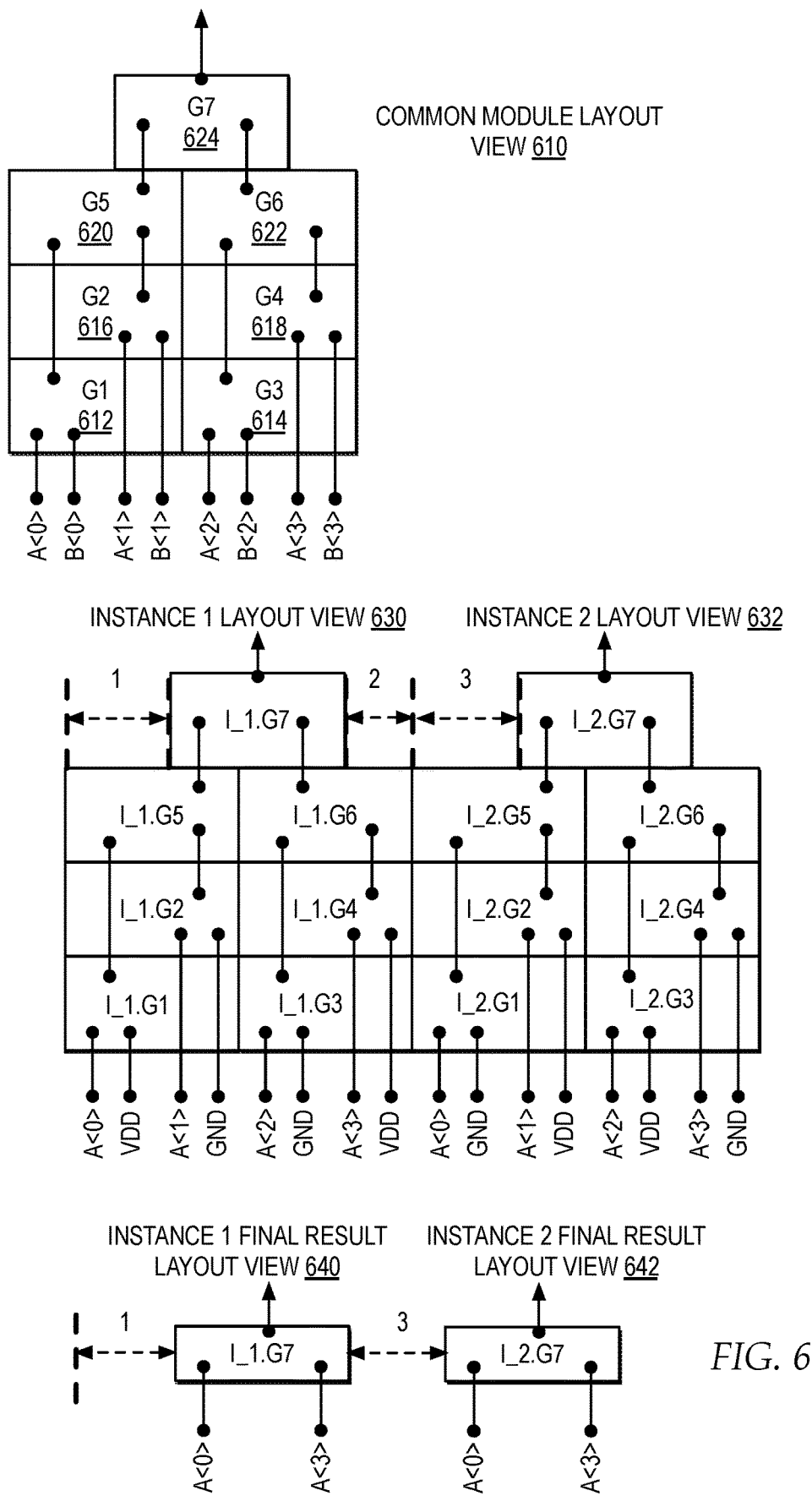
FIG. 6 is a block diagram of an example of physical layout views of a common module, structured module instances, and the final results of optimized propagation of constants of the structured module instance.

FIG. 6 illustrates a block diagram of an example of physical layout views of a common module, structured module instances, and the final results of optimized propagation of constants of the structured module instances.

In one example, a common module layout view 610 illustrates a physical view of common module 400. In the example, a first row of cells includes a G1 cell 612 and a G3 cell 614 corresponding to logical circuits G1 404 and G3 410, a second row of cells includes a G2 cell 616 and a G4 cell 618 corresponding to logical circuits G2 406 and G4

412, a third row of cells includes a G5 cell and a G6 cell corresponding to logical circuits G5 408 and G6 414, and a fourth row of cells includes a G7 cell, corresponding to logical circuit G7 416. In the example, connectors illustrate the connections of inputs "A<0>" and "B<0>" to G1 cell 612, inputs "A<1>" and "B<1>" to G2 cell 616, inputs "A<2>" and "B<2>" to G3 cell 614, inputs "A<3>" and "B<3>" to G4 cell 618, a connector from G1 cell 612 to G5 cell 620, a connector from G2 cell 616 to G5 cell 620, a connector from G4 cell 618 to G6 cell 622, a connector from G4 cell 618 to G6 cell 622, a connector from G5 cell 620 to G7 cell 624 and a connector from G6 cell 622 to G7 cell 624.

In one example, an instance 1 layout view 630 and an instance 2 layout view 632 respectively illustrate a physical view of structured module A instance 1 310 and structured module A instance 2 320. In the example, instance 1 layout view 630 includes instances of cells reflective of common module layout view 610, however, inputs "B<0>", "B<1>", "B<2>", and "B<3>" are replaced respectively by "VDD", "GND", "GND", and "VDD", as reflected in structured module A instance 1 310. In addition, in the example, instance 2 layout view 632 includes instances of cells reflective of common module layout view 610, however, inputs "B<0>", "B<1>", "B<2>", and "B<3>" are replaced respectively by "GND", "VDD", "VDD", and "GND", as reflected in structured module A instance 2 320.

In one example, an instance 1 final result layout view 640 and an instance 2 final result layout view 642 respectively illustrate a physical view of final result 542 and final result 544, each optimized by propagation of constants.

Figure 7:
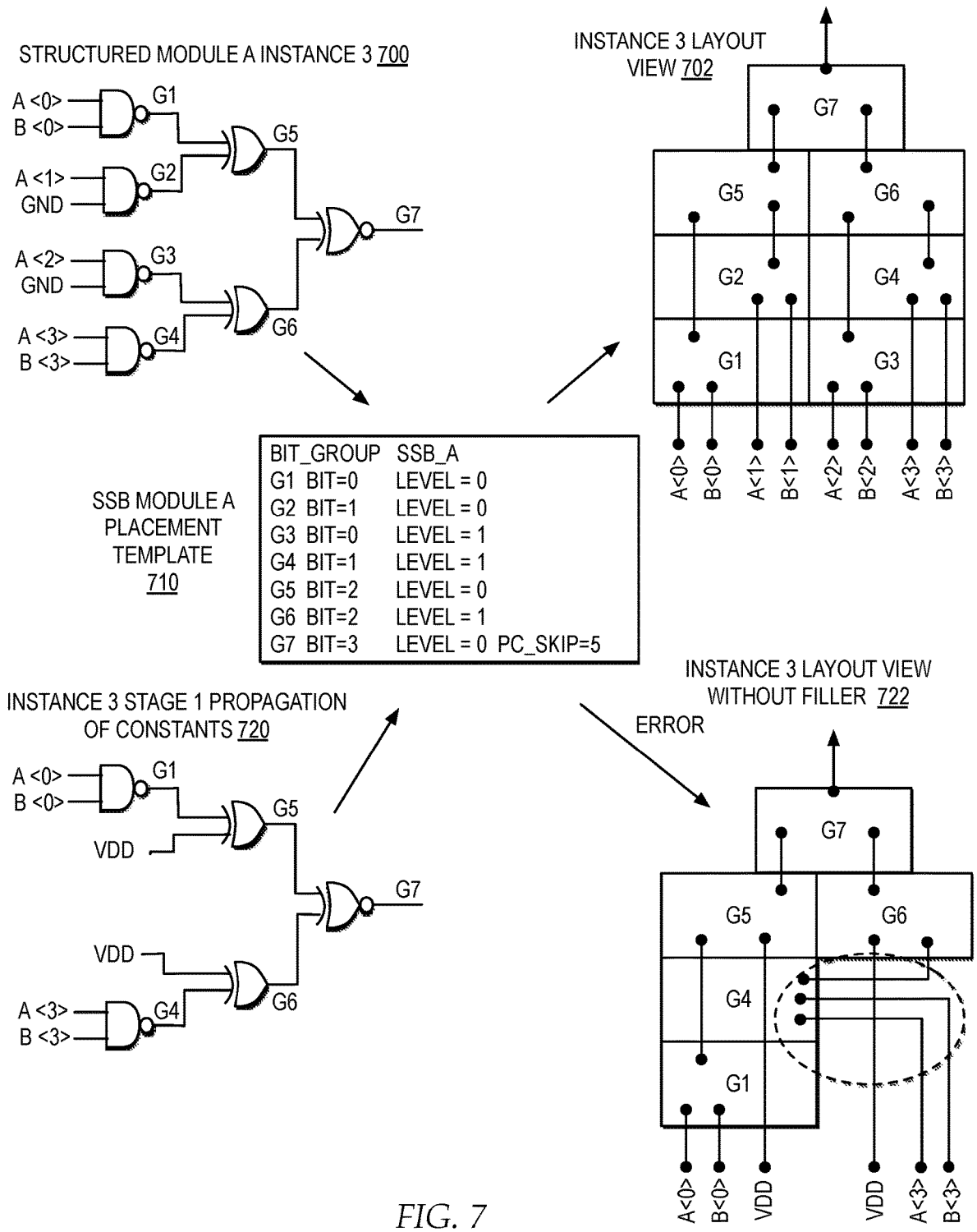
FIG. 7 is a block diagram of an example of an instance of a module for an SSB where propagation of constants is performed by modifying the logic circuit only, where the customization results in a layout with eliminated cells that cause disruption in the relative placement structure and wiring in the SSB.

FIG. 7 illustrates a block diagram of an example of an instance of a module for an SSB where propagation of constants is performed by modifying the logic circuit only, where the customization results in a layout with eliminated cells that cause disruption in the relative placement structure and wiring in the SSB.

In the example, a structured module A instance 3 700 represents an instance of common module 400, customized with inputs "A<0>", "B<0>", "A<1>", GND, "A<2>", GND, "A<3>", and "B<3>". In the example, an SSB module A placement template 710 illustrates a placement template specification for an SSB "bit_group" defined by the label "ssb_A". Each subsequent line of SSB module A placement template 710 includes a cell designator of G1-G7 and corresponding relative placement information for the designated cell. An "instance 3" layout view 702 illustrates an example of a physical layout of cells representing structured module A instance 3 700, as designed by SSB module A placement template 710.

In the example, an instance 3 stage 1 propagation of constants 720 illustrates an example of a first stage propagation of constants performed on structured module A instance 3 700. In the example, a first stage of propagation of constants removes gate G2 and gate G3 from structured module A instance 3 700 and propagates a constant of VDD to gate G5 and gate G6.

In the example, if instance 3 stage 1 propagation of constants 720 is performed to structured module A instance 3 700 without changing SSB module A placement template 710, the result is an error because the deletion of cell G2 and cell G3 from the logic in instance 3 stage 1 propagation of constants 720, when a layout is generated based on SSB module A placement template 710, results in disruption in the SSB placement and wiring. For example, if gate G2 and G3 are deleted from the logic circuit, "instance 3" layout view without filler 722 illustrates "instance 3" layout view 702, without cell G2 and cell G3. In the example, without the cell G2, the layout of cell G4 in "instance 3" layout view without filler 722 is disrupted relative to other cells and the wiring of "A<3>" and "A<4>" is also disrupted.

Figure 8:
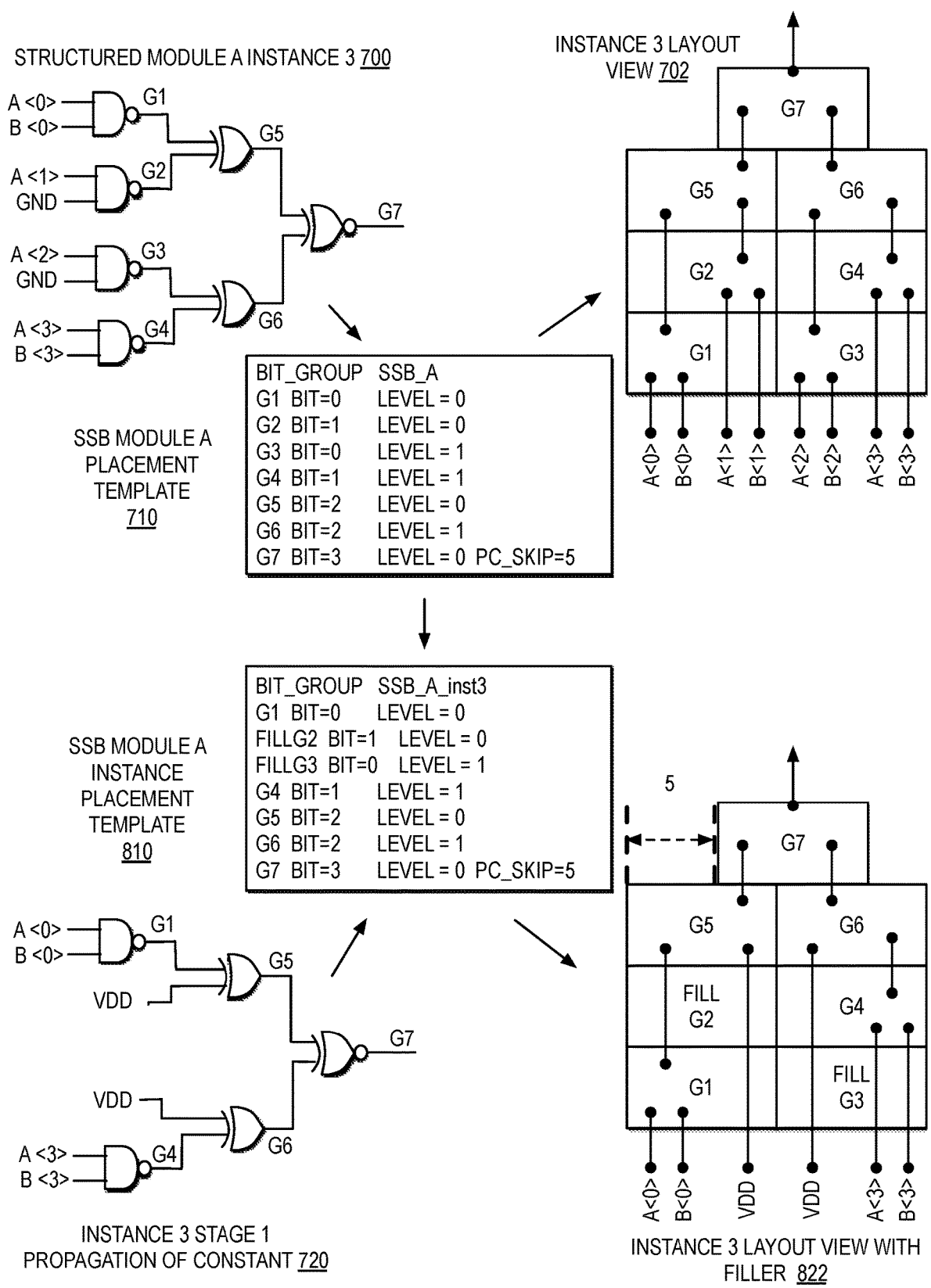
FIG. 8 is a block diagram of an example of an instance of a module for an SSB where propagation of constants is performed by modifying the logic circuit and the placement template for the SSB, where the modification optimizes the SSB by propagating constants while preserving the relative placement structure of the block as specified by the placement template.

FIG. 8 illustrates a block diagram of an example of an instance of a module for an SSB where propagation of constants is performed by modifying the logic circuit and the placement template for the SSB, where the modification optimizes the SSB by propagating constants while preserving the relative placement structure of the block as specified by the placement template.

In FIG. 8, constant propagation controller 130 modifies and optimizes the example illustrated in FIG. 7 by performing multiple steps when propagating a constant to preserve the relative placement structure of the SSB. For example, in FIG. 8, constant propagation controller 130 modifies SSB module A placement template 710 to generate an SSB module A instance placement template 810, with a label of "SSB_A_inst3", specified for "instance 3" of the SSB module. In the example, SSB module A instance placement template 810 recites the same lines for cells G1, G4, G5, G6, and G7 as in SSB module A placement template 710, however, the lines for cells G2 and G3 are replaced. In particular, in instance 3 stage 1 propagation of constants 720 gate G2 and gate G3 are deleted and in the example for SSB module A instance placement template 810, the line for cell G2 is replaced with "fillG2 BIT=1, level=0" and the line for cell G3 is replaced with "fillG3 BIT=0, level=1".

In the example, by replacing the specifications for deleted circuit gates in a modified placement template for the instance, illustrated by SSB module A instance placement template 810, with fill gates, in "instance 3" layout view with filler 822, the cells for the deleted circuit gates are replaced in the layout with fill cells in order to preserve the relative placement structure of the module as specified by the original placement template.

Figure 9:
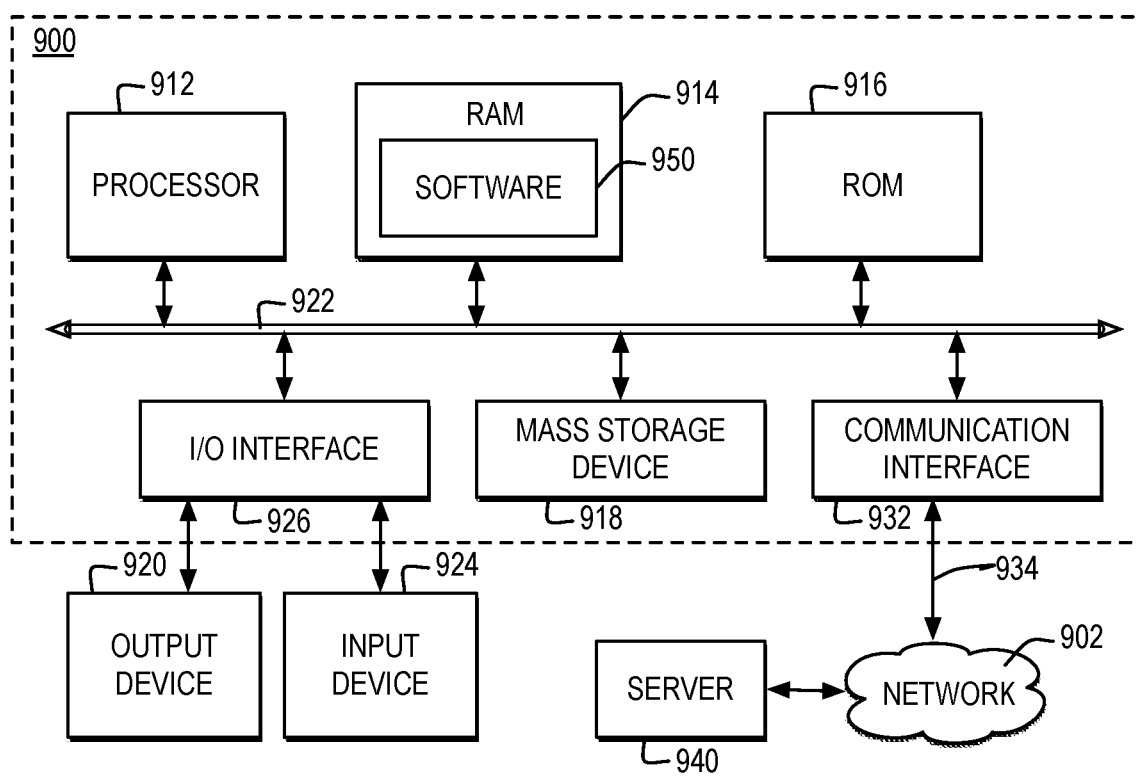
FIG. 9 is a block diagram of one example of a computer system in which one embodiment of the invention may be implemented.

FIG. 9 illustrates a block diagram of one example of a computer system in which one embodiment of the invention may be implemented. The present invention may be performed in a variety of systems and combinations of systems, made up of functional components, such as the functional components described with reference to a computer system 900 and may be communicatively connected to a network, such as network 902.

Computer system 900 includes a bus 922 or other communication device for communicating information within computer system 900, and at least one hardware processing device, such as processor 912, coupled to bus 922 for processing information. Bus 922 preferably includes low-latency and higher latency paths that are connected by bridges and adapters and controlled within computer system 900 by multiple bus controllers. In one embodiment, when implemented as a server or node, computer system 900 includes multiple processors designed to improve network servicing power.

In one embodiment, processor 912 is at least one general-purpose processor that, during normal operation, processes data under the control of software 950, which includes at least one of application software, an operating system, middleware, and other code and computer executable programs accessible from a dynamic storage device such as random access memory (RAM) 914, a static storage device such as Read Only Memory (ROM) 916, a data storage device, such as mass storage device 918, or other data storage medium. In one embodiment, software 950 includes, but is not limited to, code, applications, protocols, interfaces, and processes for controlling one or more systems within a network including, but not limited to, an adapter, a switch, a server, a cluster system, and a grid environment.

In one embodiment, computer system 900 communicates with a remote computer, such as server 940, or a remote client. In one example, server 940 is connected to computer system 900 through any type of network, such as network 902, through a communication interface, such as network interface 932, or over a network link connected, for example, to network 902.

In one embodiment, multiple systems within a network environment are communicatively connected via network 902, which is the medium used to provide communications links between various devices and computer systems communicatively connected. Network 902 includes permanent connections such as wire or fiber optics cables and temporary connections made through telephone connections and wireless transmission connections, for example, and may include routers, switches, gateways and other hardware to enable a communication channel between the systems connected via network 902. Network 902 represents one or more of packet-switching based networks, telephony based networks, broadcast television networks, local area and wire area networks, public networks, and restricted networks.

Network 902 and the systems communicatively connected to computer 900 via network 902 implement one or more layers of one or more types of network protocol stacks which may include one or more of a physical layer, a link layer, a network layer, a transport layer, a presentation layer, and an application layer. For example, network 902 implements one or more of the Transmission Control Protocol/Internet Protocol (TCP/IP) protocol stack or an Open Systems Interconnection (OSI) protocol stack. In addition, for example, network 902 represents the worldwide collection of networks and gateways that use the TCP/IP suite of protocols to communicate with one another. Network 902 implements a secure HTTP protocol layer or other security protocol for securing communications between systems.

In the example, network interface 932 includes an adapter 934 for connecting computer system 900 to network 902 through a link and for communicatively connecting computer system 900 to server 940 or other computing systems via network 902. Although not depicted, network interface 932 may include additional software, such as device drivers, additional hardware and other controllers that enable communication. When implemented as a server, computer system 900 may include multiple communication interfaces accessible via multiple peripheral component interconnect (PCI) bus bridges connected to an input/output controller, for example. In this manner, computer system 900 allows connections to multiple clients via multiple separate ports and each port may also support multiple connections to multiple clients.

Figure 10:
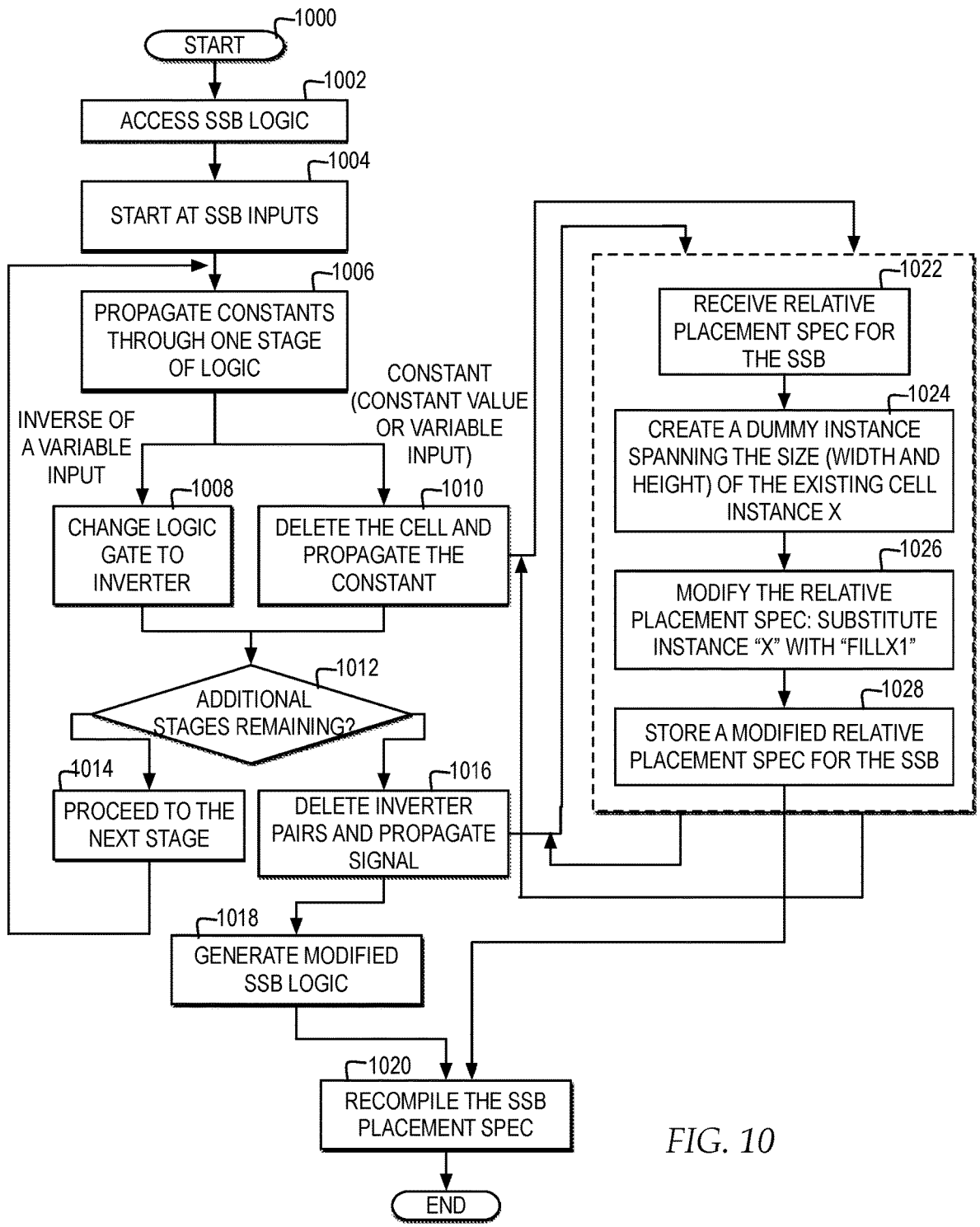
FIG. 10 is a high level logic flowchart of a process and computer program for optimizing placement of a selected group of cells in an integrated circuit by modifying SSBs by propagating constants while preserving the relative placement structure of the SSBs.

In one embodiment, the operations performed by processor 912 control the operations of flowchart of FIGS. 10-11 and other operations described herein. In one embodiment, operations performed by processor 912 are requested by software 950 or other code or the steps of one embodiment of the invention might be performed by specific hardware components that contain hardwired logic for performing the steps, or by any combination of programmed computer components and custom hardware components. In one embodiment, one or more components of computer system 900, or other components, which may be integrated into one or more components of computer system 900, contain hardwired logic for performing the operations of flowcharts in FIGS. 10-11.

In one embodiment, computer system 900 includes multiple peripheral components that facilitate input and output. These peripheral components are connected to multiple controllers, adapters, and expansion slots, such as input/output (I/O) interface 926, coupled to one of the multiple levels of bus 922. For example, input device 924 includes, for example, a microphone, a video capture device, an image scanning system, a keyboard, a mouse, or other input peripheral device, communicatively enabled on bus 922 via I/O interface 926 controlling inputs. In addition, for example, output device 920 communicatively enabled on bus 922 via I/O interface 926 for controlling outputs include, for example, one or more graphical display devices, audio speakers, and tactile detectable output interfaces, but in another example also includes other output interfaces. In alternate embodiments of the present invention, additional or alternate input and output peripheral components may be added.

With respect to FIG. 9, the one or more embodiments present invention including, but are not limited to, a system, a method, and/or a computer program product. In one embodiment, the computer program product includes a computer readable storage medium (or media) having computer readable program instructions thereon for causing a processor to carry out aspects of the present invention.

In one embodiment, the computer readable storage medium is a tangible device that can retain and store instructions for use by an instruction execution device. The computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of the present invention include one or more of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one example, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that in additional or alternate embodiments, the hardware depicted in FIG. 9 may vary. Furthermore, those of ordinary skill in the art will appreciate that the depicted example is not meant to imply architectural limitations with respect to the present invention.

FIG. 10 illustrates a high level logic flowchart of a process and computer program for optimizing placement of a selected group of cells in an integrated circuit by modifying SSBs by propagating constants while preserving the relative placement structure of the SSBs.

In one example, the process and program starts at block 1000 and thereafter proceeds to block 1002. Block 1002 illustrates accessing SSB logic. Next, block 1004 illustrates starting at SSB inputs. Thereafter, block 1006 illustrates propagating constants, whether a constant value or variable input, through one stage of logic.

At block 1006, for propagated constants resulting in an inverse of a variable input, the process passes to block 1008. Block 1008 illustrates, for logic gates in which propagating an inverse of a variable input also results in an inverse of a variable input, changing logic gates to inverters, which allows for switching existing gate implementation while relative placement specifications are preserved.

Returning to block 1006, for propagated constants resulting in a constant of a constant value or a variable input, the process passes to block 1010. Block 1010 illustrates deleting a cell and propagating the constant of a constant value or the variable input. In the example, the process illustrated at block 1010 passes to block 1022. Block 1022 illustrates receiving the relative placement specification for the SSB. Next, block 1024 illustrates creating a dummy instance spanning the size, including height and width, of the existing cell instance "X". Thereafter, block 1026 illustrates modifying the relative placement specification with a substitute for cell instance "X" of "FILLX1". Next, block 1028 illustrates storing a modified relative placement specification for the SSB, and the process returns.

Returning to block 1010, the process proceeds to block 1012. Block 1012 illustrates a determination whether additional stages remain. At block 1012, if additional stages remain, then the process passes to block 1014. Block 1014 illustrates proceeding to the next stage of the logic circuits, and the process returns to block 1006. At block 1012, if no additional stages remain, then the process passes to block 1016. Block 1016 illustrates deleting inverter pairs and propagating the signal, which triggers the process that starts at block 1022 and returns from block 1028, and the process passes to block 1018.

Block 1018 illustrates generating modified SSB logic based on the deleted and inverted gates from constant propagation. Next, block 1020 illustrates recompiling the SSB placement based on the modified SSB logic and the modified relative placement specification for the modified SSB logic, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The foregoing description is just an example of embodiments of the invention, and variations and substitutions. While the invention has been particularly shown and described with reference to one or more embodiments, it will be understood by those skilled in the art that various changes in form and detail may be made therein without departing from the spirit and scope of the invention.

What is claimed is:

1. A method comprising:
  accessing, by a computer system, at least one placement template for at least one structured soft block composed of a pre-defined set of cells with relative placement information for the pre-defined set of cells; and
  optimizing, by the computer system, implementation of the at least one structured soft block by propagating constants while preserving relative placement structure of the pre-defined set of cells within each at least one structured soft block according to the respective at least one placement template accessed for the at least one structured soft block, wherein propagating constants comprises determining, based on a respective input to a respective logic gate of a plurality of logic gates from among the pre-defined set of cells within the at least one structured soft block, whether the respective logic gate is known by a respective constant and determining whether to perform at least one of substituting and deleting the respective logic gate based on the value of the respective constant.

2. The method according to claim 1, wherein accessing, by the computer system, at least one placement template for at least one structured soft block composed of a pre-defined set of cells with relative placement information for the pre-defined set of cells further comprises:
  accessing, by the computer system, the at least one placement template for the at least one structured soft block comprising the pre-defined set of cells each correlating with one or more separate logic circuit elements, the at least one placement template specifying for each cell of the pre-defined cells, a row from among one or more rows and relative position within the row from among one or more relative positions.

3. The method according to claim 1, wherein accessing, by the computer system, at least one placement template for at least one structured soft block composed of a pre-defined set of cells with relative placement information for the pre-defined set of cells further comprises:
  accessing, by the computer system, the at least one placement template labeled for a particular instance of a common module of the at least one structured soft block.

4. The method according to claim 1, wherein optimizing, by the computer system, implementation of the at least one structured soft block by propagating constants while preserving relative placement structure of the pre-defined set of cells within each at least one structured soft block according to the respective at least one placement template accessed for the at least one structured soft block, wherein propagating constants comprises determining, based on a respective input to a respective logic gate of a plurality of logic gates from among the pre-defined set of cells within the at least one structured soft block, whether the respective logic gate is known by a respective constant and determining whether to perform at least one of substituting and deleting the respective logic gate based on the value of the respective constant further comprises:
  optimizing, by the computer system, placement of a plurality of circuit elements in a circuit design by inserting the at least one structured soft block into the circuit design; and
  optimizing, by the computer system, an area required for the at least one structured soft block in the circuit design by propagating constants of the at least one structured soft block throughout the circuit design to reduce a total number of gates required by the at least one structured soft block.

5. The method according to claim 1, wherein optimizing, by the computer system, implementation of the at least one structured soft block by propagating constants while preserving relative placement structure of the pre-defined set of cells within each at least one structured soft block according to the respective at least one placement template accessed for the at least one structured soft block, wherein propagating constants comprises determining, based on a respective input to a respective logic gate of a plurality of logic gates from among the pre-defined set of cells within the at least one structured soft block, whether the respective logic gate is known by a respective constant and determining whether to perform at least one of substituting and deleting the respective logic gate based on the value of the respective constant further comprises:
  starting, by the computer system, at one or more inputs to a particular structured soft block of the at least one structured soft block, propagating constants through each stage of the plurality of logic gates of the particular structured soft block; and
  substituting, by the computer system, a first logic gate of the plurality of logic gates, to an inverter to optimize the particular structured soft block for area, timing, and power requirements.

6. The method according to claim 5, further comprising: deleting, by the computer system, a particular cell of the set of cells by:
  deleting, by the computer system, a second logic gate of the plurality of logic gates corresponding to the particular cell and propagating a constant signal of one of a constant value and a variable input;
  creating, by the computer system, a dummy instance spanning a size of the particular cell in a particular placement template for the particular structured soft block; and
  modifying, by the computer system, an entry for the particular cell in the particular placement template to substitute the particular cell by the dummy instance, wherein the substitute dummy instances preserves relative placement structure of the pre-defined set of cells.

7. The method according to claim 5, further comprising:
  responsive to completing propagation of constants through each stage, deleting, by the computer system, a plurality of cells of the set of cells by:
  deleting, by the computer system, at least two additional logic gates of the plurality of logic gates comprising a pair of inverters and propagating a constant signal, the at least two additional logic gates each corresponding to a separate cell;
  creating, by the computer system, at least two dummy instances each spanning a size of each separate cell corresponding to the at least two additional logic gates in a particular placement template for the particular structured soft block; and
  modifying, by the computer system, a separate entry for each separate cell corresponding to the at least two additional logic gates in the particular placement template to substitute each
separate cell by one of the at least two dummy instances, wherein the at least two substitute dummy instances preserve relative placement structure of the pre-defined set of cells.

8. The method according to claim 1, wherein optimizing, by the computer system, implementation of the at least one structured soft block by propagating constants while preserving relative placement structure of the pre-defined set of cells within each at least one structured soft block according to the respective at least one placement template accessed for the at least one structured soft block, wherein propagating constants comprises determining, based on a respective input to a respective logic gate of a plurality of logic gates from among the pre-defined set of cells within the at least one structured soft block, whether the respective logic gate is known by a respective constant and determining whether to perform at least one of substituting and deleting the respective logic gate based on the value of the respective constant further comprises:
  dynamically modifying, by the computer system, a plurality of logic gates of an instance of the at least one structured soft block while propagating constants to perform at least one of changing a type of logic gate from among the plurality of logic gates and removing a logic gate from among the plurality of logic gates; and
  dynamically modifying, by the computer system, the at least one placement template to reflect the changes to the plurality of logic gates while propagating constants to preserve the relative placement structure of the pre-defined set of cells when removing the logic gate from among the plurality of logic gates.

9. The method according to claim 8, further comprising:
  recompiling, by the computer system, the dynamically modified plurality of logic gates based on the modified at least one placement template.

10. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
  program instructions to access at least one placement template for at least one structured soft block composed of a pre-defined set of cells with relative placement information for the pre-defined set of cells; and
  program instructions to optimize implementation of the at least one structured soft block by propagating constants while preserving relative placement structure of the pre-defined set of cells within each at least one structured soft block according to the respective at least one placement template accessed for the at least one structured soft block, wherein propagating constants comprises determining, based on a respective input to a respective logic gate of a plurality of logic gates from among the pre-defined set of cells within the at least one structured soft block, whether the respective logic gate is known by a respective constant and determining whether to perform at least one of substituting and deleting the respective logic gate based on the value of the respective constant.

11. The computer system according to claim 10, wherein the program instructions to access at least one placement template for at least one structured soft block composed of a pre-defined set of cells with relative placement information for the pre-defined set of cells further comprise:
  program instructions to access the at least one placement template for the at least one structured soft block comprising the pre-defined set of cells each correlating with one or more separate logic circuit elements, the at least one placement template specifying for each cell of the pre-defined cells, a row from among one or more rows and relative position within the row from among one or more relative positions.

12. The computer system according to claim 10, wherein the program instructions to access at least one placement template for at least one structured soft block composed of a pre-defined set of cells with relative placement information for the pre-defined set of cells further comprise:
  program instructions to access the at least one placement template labeled for a particular instance of a common module of the at least one structured soft block.

13. The computer system according to claim 10, wherein the program instructions to optimize implementation of the at least one structured soft block by propagating constants while preserving relative placement structure of the pre-defined set of cells within each at least one structured soft block according to the respective at least one placement template accessed for the at least one structured soft block, wherein propagating constants comprises determining, based on a respective input to a respective logic gate of a plurality of logic gates from among the pre-defined set of cells within the at least one structured soft block, whether the respective logic gate is known by a respective constant and determining whether to perform at least one of substituting and deleting the respective logic gate based on the value of the respective constant further comprise:

program instructions to optimize placement of a plurality of circuit elements in a circuit design by inserting the at least one structured soft block into the circuit design; and program instructions to optimize an area required for the at least one structured soft block in the circuit design by propagating constants of the at least one structured soft block throughout the circuit design to reduce a total number of gates required by the at least one structured soft block.

14. The computer system according to claim 10, wherein the program instructions to optimize implementation of the at least one structured soft block by propagating constants while preserving relative placement structure of the pre-defined set of cells within each at least one structured soft block according to the respective at least one placement template accessed for the at least one structured soft block, wherein propagating constants comprises determining, based on a respective input to a respective logic gate of a plurality of logic gates from among the pre-defined set of cells within the at least one structured soft block, whether the respective logic gate is known by a respective constant and determining whether to perform at least one of substituting and deleting the respective logic gate based on the value of the respective constant further comprise:

program instructions to start at one or more inputs to a particular structured soft block of the at least one structured soft block, propagating constants through each stage of the plurality of logic gates of the particular structured soft block; and program instructions to substitute a first logic gate of the plurality of logic gates, to an inverter to optimize the particular structured soft block for area, timing, and power requirements.

15. The computer system according to claim 10, the program instructions further comprising:

program instructions to delete a particular cell of the set of cells by:

program instructions to delete a second logic gate of the plurality of logic gates corresponding to the particular cell and propagating a constant signal of one of a constant value and a variable input;

program instructions to create a dummy instance spanning a size of the particular cell in a particular placement template for the particular structured soft block; and program instructions to modify an entry for the particular cell in the particular placement template to substitute the particular cell by the dummy instance, wherein the substitute dummy instances preserves relative placement structure of the pre-defined set of cells.

16. The computer system according to claim 15, the program instructions further comprising:

program instructions to, responsive to completing propagation of constants through each stage, delete a plurality of cells of the set of cells by:

program instructions to delete at least two additional logic gates of the plurality of logic gates comprising a pair of inverters and propagating a constant signal, the at least two additional logic gates each corresponding to a separate cell;

program instructions to create at least two dummy instances each spanning a size of each separate cell corresponding to the at least two additional logic gates in a particular placement template for the particular structured soft block; and program instructions to modify a separate entry for each separate cell corresponding to the at least two additional logic gates in the particular placement template to substitute each separate cell by one of the at least two dummy instances, wherein the at least two substitute dummy instances preserve relative placement structure of the pre-defined set of cells.

17. The computer system according to claim 10, wherein the program instructions to optimize implementation of the at least one structured soft block by propagating constants while preserving relative placement structure of the pre-defined set of cells within each at least one structured soft block according to the respective at least one placement template accessed for the at least one structured soft block, wherein propagating constants comprises determining, based on a respective input to a respective logic gate of a plurality of logic gates from among the pre-defined set of cells within the at least one structured soft block, whether the respective logic gate is known by a respective constant and determining whether to perform at least one of substituting and deleting the respective logic gate based on the value of the respective constant further comprise:

program instructions to dynamically modify a plurality of logic gates of an instance of the at least one structured soft block while propagating constants to perform at least one of changing a type of logic gate from among the plurality of logic gates and removing a logic gate from among the plurality of logic gates; and program instructions to dynamically modify the at least one placement template to reflect the changes to the plurality of logic gates while propagating constants to preserve the relative placement structure of the pre-defined set of cells when removing the logic gate from among the plurality of logic gates.

18. The computer system according to claim 17, the program instructions further comprising:

program instructions to recompile the dynamically modified plurality of logic gates based on the modified at least one placement template.

19. A computer program product comprises a computer readable storage medium having program instructions embodied therewith, wherein the computer readable storage medium is not a transitory signal per se, the program instructions executable by a computer to cause the computer to:

access, by a computer, at least one placement template for at least one structured soft block composed of a pre-defined set of cells with relative placement information for the pre-defined set of cells; and optimize, by the computer, implementation of the at least one structured soft block by propagating constants while preserving relative placement structure of the pre-defined set of cells within each at least one structured soft block according to the respective at least one placement template accessed for the at least one structured soft block, wherein propagating constants comprises determining, based on a respective input to a respective logic gate of a plurality of logic gates from among the pre-defined set of cells within the at least one structured soft block, whether the respective logic gate is known by a respective constant and determining whether to perform at least one of substituting and deleting the respective logic gate based on the value of the respective constant.

20. The computer program product according to claim 19, further comprising the program instructions executable by a computer to cause the computer to:

access, by the computer, the at least one placement template for the at least one structured soft block comprising the pre-defined set of cells each correlating with one or more separate logic circuit elements, the at least one placement template specifying for each cell of the pre-defined cells, a row from among one or more rows and relative position within the row from among one or more relative positions.

\* \* \* \* \*